Patented Aug. 14, 1934

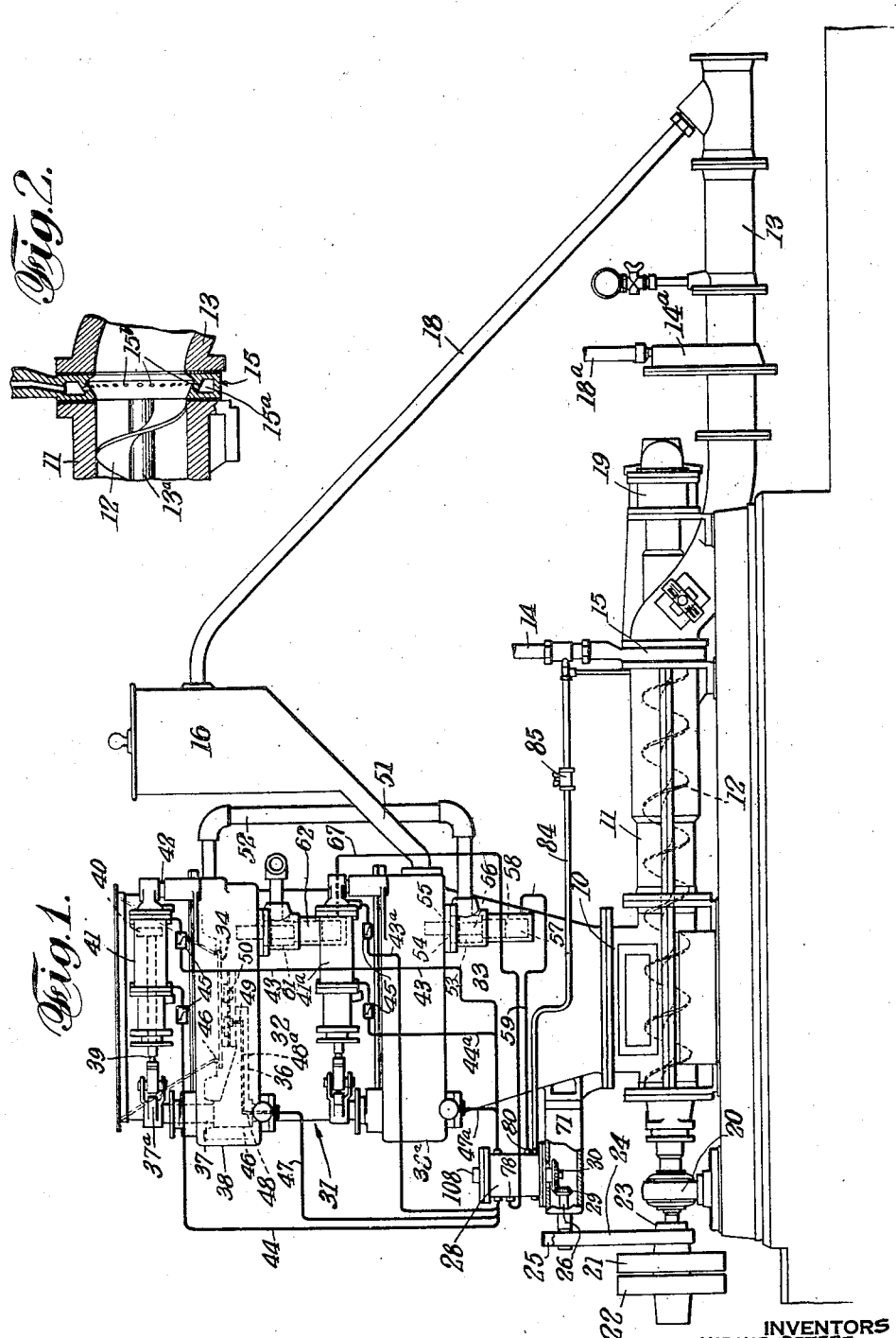

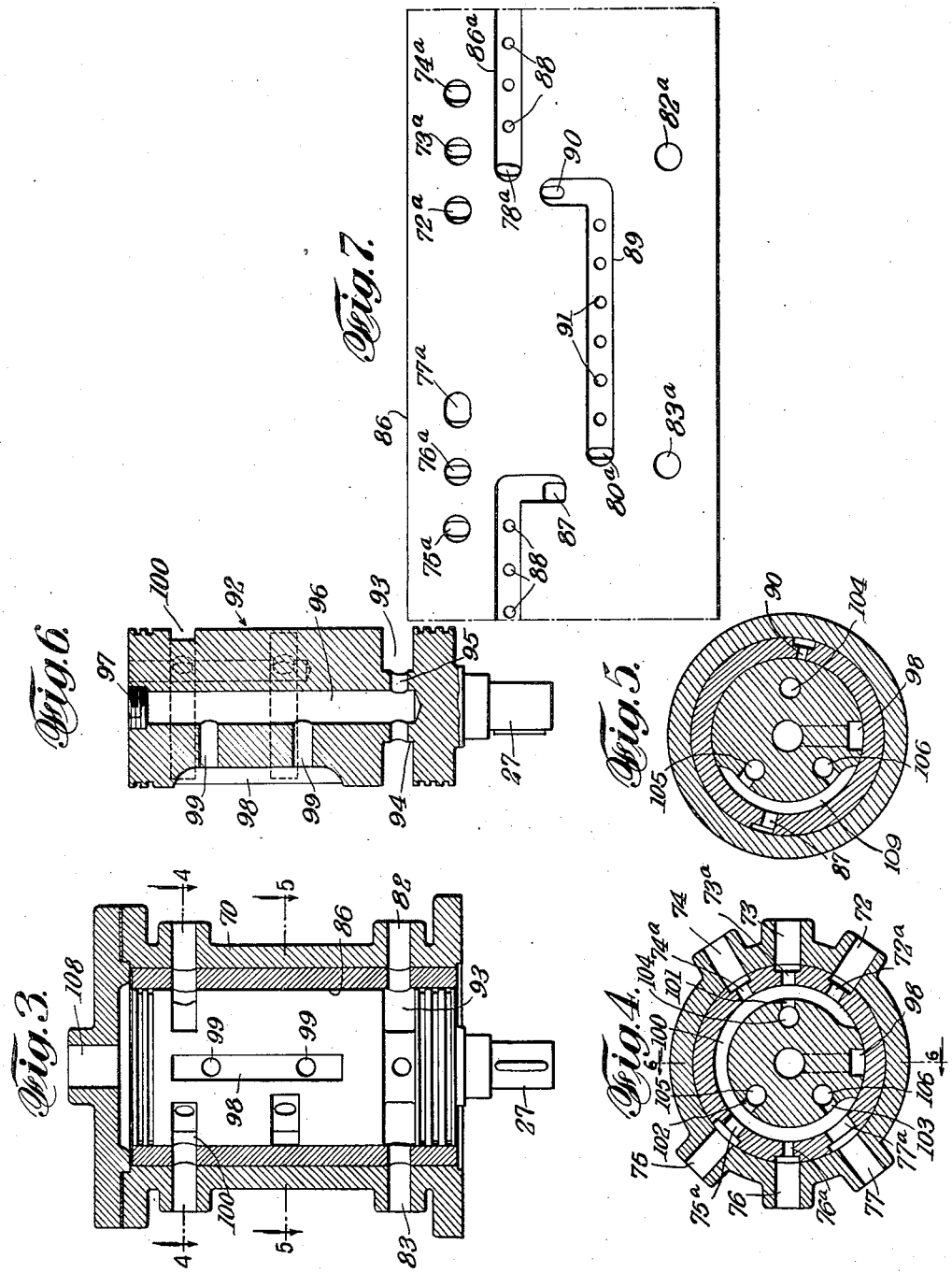

1,970,021

UNITED STATES PATENT OFFICE 1,970,021

APPARATUS FOR CONVEYING LOOSE MATERIAL

Claudius Peters, Altona, and Georg Domina, Berlin, Germany, assignors of one-half to Fuller Company, Catasauqua, Pa., a corporation of Delaware, and one-half to Cement Gun Company, Allentown, Pa., a company of Delaware Application February 24, 1933, Serial No. 658,346
In Germany April 28, 1932

7 Claims. (Cl. 302—55)

This invention relates to the conveying of dry, pulverulent or finely divided materials, such as cement, cement raw material, powdered coal and the like; and is concerned more particularly with a method and apparatus whereby such materials can be conveyed economically through conduits or pipe lines over long horizontal distances.

The invention involves certain improvements and modifications in the apparatus and method of the type generally disclosed in Kinyon Patent No. 1,677,119. In the more common commercial form of the apparatus of the patent, the material to be conveyed is introduced into a casing connected to the pipe line, and is advanced for a short distance by means of an impeller screw or equivalent device, so arranged that the material is compacted near the end of the screw, to form a dense seal. Slightly beyond the end of the screw, compressed air or other gas is injected into the material, and the seal serves to prevent the rearward flow of air along the screw flights. The main purpose of the air so admitted is to change the state of the material from a relatively inert and dense mass to a fluent condition, whereby this fluent column is forced through the remainder of the pipe line under the pressure of the screw in displacing material into it, and the normal expansion of the air.

It will be realized that if a seal of sufficient density is not formed, the air escaping rearwardly will not only fluidize the material acted upon by the screw and seriously reduce the efficiency of the latter, but will also contribute to a pressure decrease in the transport line itself. This pressure drop makes it difficult to maintain the fluent condition throughout the length of the system, and involves waste of power.

Where the material is to be conveyed over long distances, or where the resistance of the transport system is increased by a large number of distributing valves and pipe bends, a seal of great density must be formed to resist the effect of back-pressure. Under certain conditions it has been found that by increasing the inlet air pressure, the latter will react against the material advanced by the screw, and assist in compacting the material forming the seal.

It will be evident that this practice involves an excessive cost in power in overcoming the friction of the material seal, and the reaction of back-pressure upon the screw flights. Further, as is well understood, high inlet pressures necessarily involve considerably greater compressor power input to raise the air pressure to the desired degree. It is, accordingly, an object of the present invention to avoid these and other difficulties including wear on the parts, by forming a seal mechanically and to equalize the reaction of back-pressure at both the inlet and discharge ends of the impeller screw, or other forwarding device. It is the intention to reduce the compacting effect of the screw to a minimum so that the material seal will be of low density, and consequently offer little frictional resistance; thus the apparatus can be operated with the minimum power applied to the impeller screw necessary to displace material into the system, and apply pressure to the fluent column. Likewise, the air inlet pressure can be reduced to the minimum which will maintain the proper flow of air into the system to establish the necessary fluency. This decrease in pressure not only involves savings in compressor power, but also by reducing the action against the impeller screw, less power is required to drive the latter.

It is a further object of the invention to provide for continuous operation by combining with a pump of the type described, or similar device, a double air-lock, which forms the seal; arranged so that sufficient charges of material are continuously supplied to the pump, without substantial loss of pressure in the system. Means are provided to equalize the pressures between the airlock and the entrance to the transport line, so that the impeller screw is relieved of the reaction of back-pressure.

In carrying out the invention according to the preferred form, we have combined with a pump of the type described, an automatic, double airlock charging mechanism, preferably driven from the same source of power as the pump. Connections are made whereby the pressure in the hopper above the pump is maintained substantially equal to the entrance of the pipe line system.

Other objects and advantages will appear upon consideration of the following description and in the drawings, in which;

Fig. 1 is a view in elevation of a preferred embodiment of the invention;

Fig. 2 is a view illustrating a form of air ring used at the discharge end of the impeller screw;

Fig. 3 is a vertical section through the controlling device.

Fig. 4 is a horizontal section taken along line 4—4 of Fig. 3;

Fig. 5 is a horizontal section taken along line 5—5 of Fig. 3;

Fig. 6 is a vertical section of the rotary member of the automatic air control, taken along line 6—6 of Fig. 4; and Fig. 7 is a view of the outer surface of the distributing sleeve of the automatic air control device, developed on a plane surface.

Referring to the drawings, and first to Fig. 1, the apparatus is seen to consist of a hopper 10, through which the material to be conveyed is supplied to a casing 11. Within the casing an impeller screw 12 serves to advance the material and displace it into the pipe line 13, through which it is conveyed to the ultimate points of delivery. Compressed air or other gas, from any suitable source, is supplied to the apparatus through the inlet pipe 14, which is connected to the air ring 15, located normally a short distance beyond the terminal flight of the impeller screw 12.

As shown in Fig. 2, the air ring is formed with a peripherial passage 15a, from which the air is discharged into a plurality of openings 15b, the ports or openings being normally inclined forwardly and inwardly to cause the air to enter the material in the direction of conveying and assist in its advance.

The impeller screw 12 has a shaft 13a, supported beyond its discharge end (Fig. 2) by a closed bearing 19, and at its opposite end in a suitable outboard bearing 20. The shaft is normally driven by a prime mover, such as an electric motor (not shown), which is directly connected through a flexible coupling, formed with the usual two half sections, 21 and 22. The half 21 of the coupling, secured to the screw shaft, may be conveniently provided with an extension 23, forming a pulley for the belt 24, which connects with a pulley 25 on shaft 26, which drives the vertical shaft 27 of the air control device 28, through the bevel gears 29 and 30. The control device 28 is adapted to act in connection with the pump screw, to control the operation of the charging device 31.

The charging device comprises an upper chamber 32, and a lower chamber 33, which may be closed at their tops by doors or gates 34. These doors are operated in the same manner, and therefore a description of the upper one taken alone will be sufficient. The doors preferably move horizontally, the door 34 moving between open and closed positions by means of an arm 36, on one end of which the door is mounted. At its other end, the arm 36 is fixed on the shaft 37, journalled at the upper and lower walls of an enlargement 38 at the upper end of chamber 32. At its top, the shaft is provided with an arm 37a, pivotally connected with a piston rod 39, attached to a piston 40 in a cylinder 41, which is pivotally mounted at its rear end on a pivot 42, carried by the upper part of the chamber 32.

The door 34 may be shifted to open position by introducing air to the head end of the cylinder 41, through a line 43, connected with the air control 28; and the door may be swung to a closed position by introducing air through the line 44 to the piston rod end of the cylinder 41.

To prevent sudden throwing from one position to the other, exhaust-retarding devices 45 are inserted in the lines 43 and 44. The devices 45 offer no resistance to the passage of air into the cylinder, but serve to prevent rapid exhaust of air therefrom.

In order to facilitate the movement of the door 44, when swinging from one position to the other, it is at a lower level than a sealing ring 46, surrounding the opening closed by the door.

To raise the door to the sealing position against the ring 46, air may be supplied through a line 47 to the lower end of the shaft 37, which it connects with a duct or passage 48 in the shaft 37. This duct connects with a duct 48a, extending through the arm 36 to a position near the free end thereof, where it connects with an upwardly extending duct 49, connecting with a chamber 50, at the upper side of the arm. This chamber 50 is covered by a diaphragm connected at its edge with an annular flange projecting downwardly from the door 34, and, when compressed air is admitted through these ducts to the chamber 50, the door will be raised into engagement with the sealing ring 46, and will be held in this position by air pressure in the upper chamber.

To maintain air pressure in the two chambers 32 and 33, the upper part of the chamber 33 is connected with the air equalizing chamber or receiver 16, by pipe line 51. It should be understood that the capacity of the air chamber 16 is sufficient to smooth out fluctuations of pressure.

Compressed air may be supplied to the upper part of the chamber 32 by means of a compressed air line 52, which extends to a position beneath the overhanging enlargement 38a of the upper part of the lower chamber. At this point, it is connected with a cylinder 53, communicating at its top through a reduced opening 54, with the interior of the portion 38a of the lower chamber.

Mounted in the cylinder 53 is a control valve or piston 55, which, when in raised position, shuts off connection between the opening 54 of the air line 52, but when lowered beneath the entrance of the line 52, permits air to pass from one chamber to the other. Control of the piston 55 may be effected by means of a piston rod 56, extending downwardly therefrom into a smaller cylinder 57, where it is provided with a corresponding piston 58. The lower end of the cylinder 57 is connected by means of an air line 59 with the air control device 28.

At the lower side of the enlargement or overhanging extension 38 of the upper chamber, provision is made for means for relieving the pressure in the upper chamber, and reducing it to atmospheric pressure. In the same way as for the lower chamber, this pressure relieving means 62 for the upper chamber may be operated by compressed air, supplied through the air line 67.

Preferably all of the compressed air admitted to the air chamber 16, and from it communicated through the pipe line 51 to the chambers as described above, is obtained from the conduit 13, through the piping connection 18. Thus, the pressures in the lower feeding chamber 33 and the pump hopper 10 are equalized through the piping 18, the chamber 16, the pipe lines 51 and 52, and accordingly back-pressure reaction through the casing 11 and against the impeller screw 12 is avoided.

To prevent the accumulation of pulverized material in the chamber 16, its bottom is preferably steeply sloped and arranged to discharge freely into the pipe line 51, so that the material will descend by gravity into the chamber 33.

When the system is to be shut down for a considerable time, a valve 14a, in the conduit 13, is closed and compressed air admitted to the pipe line through the connection 18a, to cause the latter to be cleared by the admission of air at sufficient pressure and volume to move the material before the latter loses its fluency.

The air controller 28 includes a cylindrical outer casing 70, which is mounted on a casing 71 projecting from the side of the lower chamber. Near its upper end, the cylindrical casing is provided with six ports in the same horizontal plane arranged in two groups, three ports 72, 73 and 74 being in one group and the other ports 75, 76 and 77 being in the other group (see Fig. 4). As indicated in Fig. 1, port 72 is connected by a duct 44 with the piston rod end of the upper cylinder 41, port 73 is connected by a duct 47 with the interior of the upper door-supporting arms 36, port 74 is connected by a duct 43a with the head end of the lower cylinder 41a, port 75 is connected by a duct 44a with the piston rod end of the lower cylinder 41a, port 76 is connected by a duct 47a with the interior of the lower door-supporting arm, port 77 is connected by the duct 43 with the head end of the upper cylinder 41. Beneath the ports 72 and 73 and at a lower level is a port 78 connected by a duct 59 with the lower end of the device 62 for controlling the exhaust of air from the upper chamber.

At a still lower level than the port 78 and between the ports 76 and 77, is a port 80 connected by a duct 59 with the lower end of the device 62 controlling the passage of air from the lower chamber to the upper chamber. Near the base of the casing 70 are two opposite ports 82 and 83, through either one of which air may be supplied to the interior of the casing. As here shown, air is supplied through the port 82 and it should be understood that the other port 83 may be closed in any suitable manner. Air may be supplied to port 82 through a supply line 84, connected with the compressed air line 14. Control of the air supply through the line 84 may be controlled by a suitable valve 85.

Inside the casing 70 is a normally stationary sleeve 86, provided with ports and passages through which compressed air passes to the outlet ports in the casing 70. Viewed from the outside, as illustrated in Fig. 7, the sleeve 86 is provided with ports 72a, 73a, 74a, 75a, 76a, 77a substantially in register with the outlet ports 72, 73, 74, 75, 76 and 77 in the casing 70; with ports 78a and 80a substantially in register with the outlet ports 78 and 80; and with ports 82a and 83a substantially in register with the inlet ports 82 and 83.

At the outside of the sleeve 86 the port 78a is connected with a groove 86a extending in a counterclockwise direction, as viewed from above, around the sleeve to a point almost directly beneath the port 76a and then downwardly to a point substantially midway between the levels of the ports 78a and 80a, where it communicates with a port 87 passing through the sleeve 86. At the bottom of the groove there is a series of smaller openings or ports 88, connected with the interior of the sleeve. In a similar manner the port 80a is connected at the outer side of the sleeve 86 with a groove 89 extending around the sleeve to a point opposite the interval between the ports 72a and 73a and then upwardly to a port 90 at the same general level as the port 87, the groove 89 communicating with one or more small openings or ports 91, connecting the bottom of the groove with the inner side of the sleeve.

Inside the sleeve 86 is a rotary member or rotor 92, which fits closely in the sleeve 86. At the level of the ports 82 and 83 in the casing, the rotor is provided with a deep circumferential channel or chamber 93, surrounding a cylindrical shaped portion 94, provided with a diametrical bore 95 communicating with an upwardly extending axial bore or passage 96. Preferably, for convenience in manufacturing and assembly, the bore 96 is made from the top of the rotor and its upper end is closed later, as by means of a plug 97. To supply air to the ducts leading from the control device 28, provision may be made of a longitudinal groove 98 at the cylindrical surface of the rotor or plug and one or more radial ducts or passages 99 connecting the groove with the axial bore 96. It should be understood that the groove 98 must be of sufficient length to extend from the upper side of the ports 72a, 73a, 74a, 75a, 76a and 77a to the lower part of the port 80a. In the illustrated embodiment of the invention, the driving shaft 27 of the controller 28 is integral with the rotor.

Provision must also be made for venting or exhausting the air from the various ducts leading from the control 28. For the upper ducts this may be done by means of a circumferential groove 100, extending around the rotor 92 at a level corresponding to that of the upper ports, and of radial bores 101, 102 and 103 connecting the groove 100 with longitudinal exhaust bores 104, 105 and 106 respectively. The groove 100 is of sufficient length to connect all of the ports 72, 73, 74, 75, 76 and 77 at one time and comes so close to the longitudinal groove 98 at opposite sides thereof that, when any one of these ports is connected with air supply groove 98, all of the others will be connected with the circumferential exhaust groove 100.

The exhaust bores or passages 104, 105 and 106 extend to the upper end of the rotary member 92, so that air exhausted therethrough may pass out of the controller through port 108 in the upper end of the controller casing.

The exhaust of air from the lines connected with the ports 78a and 80a is effected through ports 87 and 90. (Fig. 7) located at a level midway between the levels of the ports 78a and 80a, and through a circumferential groove 109 (Fig. 5) communicating with the exhaust bores 105 and 106.

The operation of the apparatus is substantially as follows: Rotation of the pump screw 12 will cause the fine, loose material in the casing 11 to be compacted and forced therefrom through the air ring 15 into the discharge pipe 3. The compressed air passing through the air ring 15 into the line to which the material is being pumped is mixed with the particles therewith to produce fluent material; that is, material in a condition to flow easily.

The rotation of the pump screw shaft 13a is utilized in turning the rotor 92 of the air controller 28 through connections hereinbefore described. As shown in Fig. 4, the vertical supply groove 98 on the rotor has passed the port 77a where it acted to supply air to the line 43 and thereby open the upper door 34 and is connected to port 80a and line or duct 59 to prevent passage of air from the lower chamber 33 through the duct 52 to the upper chamber which is now open at its top.

As the rotor continues its movement, the supply groove 98 passes the subsidiary ports 91 and through the groove 89 and port 90 keeps up the supply of air through port 80a and duct 59 until the supply groove passes the port 90, whereupon the exhaust groove 109 is connected with the port 90 and serves to exhaust the air from line 59 and connect the two chambers through passage or duct 52. Just before reaching the port 90, the supply groove 98 passes the port 72ª and closes the upper door 54, and just after passing the port 90 the groove 98 cooperates with the port 78a to close the exhaust or vent device for the upper chamber, this action being continued by supplying air through a plurality of secondary ports 88 and port 87, all of which are connected with groove 86.

After passing the port 78a the supply groove 98 reaches the port 73a through which and the duct 47 the air passes to and through the arm 36 to raise the door 34 against the sealing ring 46 where it will tend to be held by the air pressure in the corresponding chamber. When the supply groove 98 reaches the port 74a, air will be admitted through duct 43a, to the head end of the cylinder 41a thereby opening the lower door. This door will remain open until the supply groove reaches the port 75a, through which and a line or duct 44a air is supplied to the piston rod end of the cylinder 41a to move the lower door to a closed position.

As the supply groove 98 passes the port 76a, air is supplied through duct 47a to raise the lower door to sealing position. At substantially the same time, the exhaust groove or channel 109 reaches the port 87 connected with port 78a and exhausts the line 67 to vent the upper chamber, and the groove 98 reaches the port 80a to shut off communication between the two chambers through duct 52. Finally the supply groove 98 reaches the port 77a and the air passes through duct 44 to the head end of cylinder 41 to move door 34 to open position, thus completing one cycle of operation.

Inasmuch as the air at one end of each cylinder is at substantially atmospheric pressure when air is admitted at the other end, there will tend to be excessive speed of movement of the corresponding door thus rendering it difficult to stop the same at the end of its movement. Trouble of this kind is, however, avoided by the use of the retarding devices 45.

The operation of the apparatus will be apparent from the above description, and it will be realized that by means of the double air lock, sufficient charges of material are continuously supplied to the hopper 10. As the hopper is maintained under pressure substantially equal to that of the transport pipe line 13, a considerable friction loss is avoided, as it is not necessary to form a densely compacted material seal near the terminal flight of the screw, and further the wear on the parts is considerably reduced.

Thus, equalizing pressure has the further advantage of reducing compressor power by admitting the air or other gas at the minimum pressure necessary for the purpose described above. The double chamber air lock permits the continuous operation of the apparatus and causes the pressure to be maintained in the hopper 10 substantially without variation.

It should be understood that various changes may be made in the construction and arrangement of parts, and that various features may be used without others, without departing from the true spirit and scope of the invention.

Having thus described our invention, we claim

1. The combination with a conveyor screw, a casing for the screw having a hopper at one end thereof, a conduit to receive material from the conveyor screw, and an air device adjacent to the discharge end of the screw conveyor to supply compressed air to the conduit and render more fluent the material advanced by the screw conveyor; of means for supplying material to said hopper including a double air lock, means actuated in synchronism with the screw for operating the double air lock and a connection between said conduit and said hopper for supplying compressed air to the air lock at said pressure to replace the air lost in passing material therethrough and maintain the pressure in the hopper.

2. The combination with a conveyor screw, a casing for the screw having a hopper at one end thereof, a conduit to receive material from the conveyor screw, and an air ring adjacent to the discharge end of the screw conveyor to supply compressed air to the conduit and render more fluent the material advanced by the screw conveyor; of means to supply material to said hopper including a lower chamber communicating at its lower end with said hopper, a door at the top of said chamber, an upper chamber connected at its lower end with the upper end of the lower chamber, a door at the top of the upper chamber, means for supplying compressed air from said conduit to said lower chamber at said pressure, a pressure-equalizing duct connecting said chambers, a controlling valve for said duct, and means acting in synchronism with said screw to effect in order opening of the upper door to permit material to be introduced into the upper chamber, closing of the upper door, raising of the pressure in the upper chamber to that in the lower by opening said controlling valve, opening of the lower door to admit into the lower chamber material from the upper chamber, and closing of the lower door.

3. The combination with a conveyor conduit, means for admitting at one point elastic fluid under pressure to the conduit to render the material more fluent, means for supplying material to said conduit at a point spaced from the point of admission of elastic fluid, and mechanical means for compacting and advancing the material in the conduit between the point of supply of material and the point of admission of the elastic fluid; of means for feeding material to the supplying means including a lower chamber, a lower door at the top thereof, an upper chamber, an upper door at the top thereof, a connection between the lower chamber and said conduit to maintain the pressure in the lower chamber substantially equal to that in the conduit, a connection between the lower chamber and the upper to enable the pressure in the upper chamber to be brought up to that in the lower chamber, and means for controlling the opening and closing of the doors and the opening and closing of the connection between the chambers.

4. The combination with a conveyor conduit, means for admitting at one point elastic fluid under pressure to the conduit to render the material more fluent, a hopper for supplying material to said conduit at a point spaced from the point of admission of elastic fluid, and compacting means for advancing the material in the conduit between the point of supply of material and the point of admission of elastic fluid; of a lower chamber above said hopper, a lower door closing the top of said chamber, an upper chamber above the lower chamber, an upper door at the top of said chamber, an exhaust for the upper chamber, a connection between the lower chamber and the upper chamber to supply elastic fluid from the lower chamber to the upper, means acting in synchronism with the compacting means for controlling said doors, the exhaust for the upper chamber and the connection between the chambers, and a connection between said conduit and said lower chamber to supply compressed elastic fluid to said lower chamber, said connection including a receiver adapted to smooth out the fluctuations due to the air lock.

5. In an apparatus for conveying pulverized material, the combination with a receiving hopper, a conduit, a casing connected to the bottom of the hopper and opening into the conduit, means within the casing for withdrawing material from the hopper and forcing it in a mass through the casing to deliver it to the conduit, and means for supplying compressed air to the conduit adjacent to the discharge end of said casing, of an air lock closing the top of the hopper, and a connection from the conduit to the hopper to supply compressed air to the hopper at a pressure substantially equal to the pressure in the conduit.

6. In an apparatus for conveying pulverized material, the combination with a receiving hopper, a casing connected to the bottom of the hopper and opening into a conduit, means within the casing for withdrawing material from the hopper and forcing it in a dense mass through the casing to the conduit, and means beyond the withdrawing means for supplying compressed air to the conduit, of an air lock closing the top of the hopper, means for supplying compressed air to the hopper from the conduit at a pressure substantially equal to the pressure in the conduit, and means for operating said air lock in timed relation with the withdrawing and forcing means.

7. In an apparatus for conveying pulverized material, the combination with a receiving hopper, a conduit, a casing connected to the bottom of said hopper and discharging into said conduit, means within the casing for withdrawing material from the hopper and forcing it in a compact mass through the casing to the conduit and means for supplying compressed air to the conduit, of an air lock closing the top of the hopper and a connection between the conduit and the hopper to maintain the latter substantially under the same air pressure as the conduit.

CLAUDIUS PETERS.
GEORG DOMINA.